Dec. 1, 1959     A. A. WOLF     2,915,629
ELECTRONIC EXPANDER CIRCUIT
Filed Sept. 29, 1955     2 Sheets-Sheet 1

INVENTOR.
ALFRED A. WOLF
BY
ATTORNEYS

INVENTOR.
ALFRED A. WOLF

United States Patent Office 2,915,629
Patented Dec. 1, 1959

2,915,629

ELECTRONIC EXPANDER CIRCUIT

Alfred A. Wolf, Philadelphia, Pa.

Application September 29, 1955, Serial No. 537,601

4 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

The present invention relates to an electronic expander circuit and more particularly to an electronic circuit for generating pulses of sinusoids of linearly expanding amplitude.

Modern detection systems utilize oscilloscopes for visual indication of the sweeping signal and reflected waves indicating the presence and location of a target. A variety of techniques have been developed for showing the above visually on the oscilloscope screen. One method utilizes a point in the center of the screen from which extends a single radial line which sweeps the screen by rotating about the center point. A second system finding extensive use in home television screens provides for a single line of light at one end of the screen sweeping across the length of the screen. Another technique for sweeping oscilloscope screens uses an expanding circle of light starting from a dot in the center of the screen. This method is especially advantageous since this type of representation most nearly approaches the type of representation shown on maps. However, in order for this method to function properly, the circle in expanding must do so at a linear rate in order to be consistent with map distances. Present arrangements suggested for producing this type of sweep either lack an exact linear expansion or tend to produce the expansion in increments rather than in a smooth and continuous process. For example, one arrangement heretofore proposed utilizes a sine wave producing circuit feeding into a mechanical attenuating device utilizing a carbon pile. The attenuator is driven by an electric motor. This arrangement is expensive, and due to the poor rubbing characteristics of carbon, the pile wears at an excessive rate. In addition, if a wire wound resistor is substituted for the pile, crossing of the wires by the pick-off creates an increase in radius by discrete movements rather than in a smooth and continuous process.

The present invention proposes to overcome the disadvantages of the prior devices used in the expanding circle method of sweeping. The arrangement presented here is completely electronic and proposes to feed a constant amplitude sine wave and a linear sawtooth wave simultaneously into a novel expander circuit which produces sine waves which expand linearly in amplitude in the shape of the sawtooth wave. The output of the expander circuit may be fed into a phase-splitting network which output provides two waves of the same type but which are 90 degrees out of phase. These two sets of waves are applied to the two pair of perpendicularly arranged deflection plates of the cathode ray tube for producing on the screen of the oscilloscope or cathode ray tube an expanding circle of luminosity.

Therefore, it is a first object of this invention to produce a timing wave which is sinusoidal in form and expands in amplitude at a linear rate.

A further object of this invention is to provide an apparatus for modulating a sine wave with a periodically recurring sawtooth wave and at the same time isolating the sine wave from the sawtooth wave to prevent interaction therebetween.

A further object of the present invention is to provide an apparatus for producing a timing signal for use in oscilloscopes, having the visual representation of a point expanding as a circle at a linear rate.

Still another object is to provide a single frequency circuit for producing a linearly expanding in amplitude sine wave for use with a high impedance load.

Still another object of this invention is to provide a triode and a diode in parallel for mixing a constant amplitude sine wave supplied to the grid input of the former and a sawtooth input to the diode for producing in a common cathode circuit for each of said triode and diode an output signal which represents the sine wave modulated by said sawtooth wave.

With these and other objects in view, as will hereinafter more fully appear, and which will be more particularly pointed out in the appended claims, reference is now made to the following description taken in connection with the accompanying drawings in which:

Figure 1:
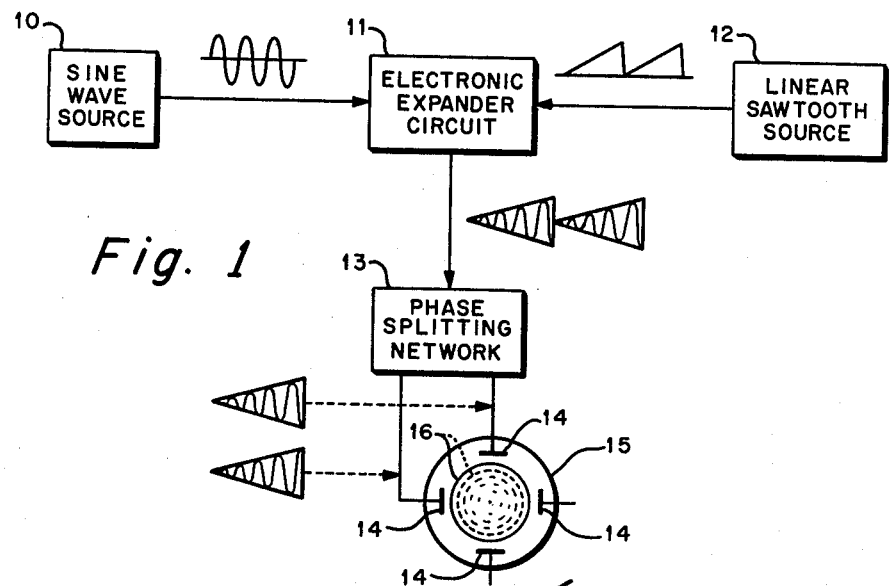
Fig. 1 shows a block diagram illustrating schematically the operation of the instant apparatus.

Referring now to the drawings where like reference characters designate like or corresponding parts throughout the several views there is shown in Fig. 1 a conventional source 10 for a constant amplitude sine wave which is applied to the novel expander circuit 11. A source 12 also applies a sawtooth wave as a second input to expander circuit 11. The expander circuit 11 produces, as will be hereinafter explained, linearly expanding pulses of sinusoidal waves which, when subjected to the action of a conventional phase splitting network 13, becomes a pair of identical series of pulses spaced in phase 90 degrees apart. These waves are used on the deflector plate 14 of a cathode ray tube 15 in a conventional manner to produce the expanding circle shown at 16.

Figure 2:
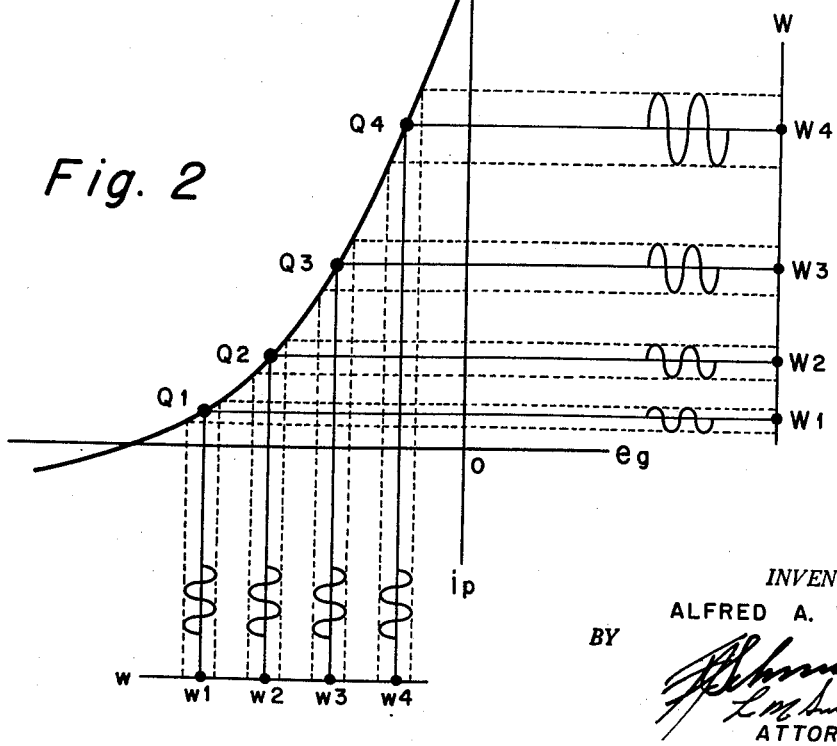
Fig. 2 illustrates the characteristic curve for a triode operating according to the principles of this invention.

Fig. 2 shows the operating characteristics of a typical triode vacuum tube used in expander circuit 11. Plotted are the grid bias voltage vs. the plate current. As is understood in the art, for a particular grid bias voltage applied, the point on the curve at this voltage indicates the quiescent point Q. Four such points are shown, indicated as $Q_1$, $Q_2$, $Q_3$, and $Q_4$, respectively. Four inputs to the triode $w_1$, $w_2$, $w_3$, and $w_4$, are superimposed on the curve at the four respective quiescent points which are spaced at equal voltages apart on the bias grid voltage ($e_g$) coordinate. The amplified wave is shown as $W_1$, $W_2$, $W_3$, and $W_4$, respectively, and it will be noted that as the quiescent point moves to the right on $e_g$, the ampliture of $W_1$, $W_2$, etc., increases progressively. It is apparent that the rate of amplitude increase in W will depend upon the shape of the characteristic wave of the triode. If the grid bias voltage ($e_g$) is made to increase at a linear rate along the $e_g$ axis such as may be caused by the sawtooth voltage from source 12, then it is apparent that a characteristic curve of a specific shape is required if the output sine wave W would also be increased in amplitude at a linear rate.

It may be shown that a characteristic curve following the square law, $i_p = a + b e_g^2$, where $a$ and $b$ are constants may bring about this result. The input wave $w$ amplitude multiplied by the slope of the curve at the particular quiescent point or $e_g$ voltage is a direct measure of the amplitude of the final signal W. The slope of the curve is $g_m$ (grid-plate transconductance) and is defined as $$\frac{\partial i_p}{\partial e_g}$$

Differentiating the square law equation above to obtain the slope of the curve, $$\frac{di_p}{de_g} = g_m = 2be_g$$

or, the slope is directly proportional to the voltage along the $e_g$ axis. Since it has already been noted that the output amplitude or voltage is directly proportional to the slope of the curve, then the output voltage is also directly proportional to $e_g$. Thus, if $e_g$ is made to increase linearly, as by a periodically recurring sawtooth voltage shown in Fig. 1, then for a triode having a characteristic wave following the square law in its operating range, an output of linearly increasing amplitude will be produced.

Figure 3:
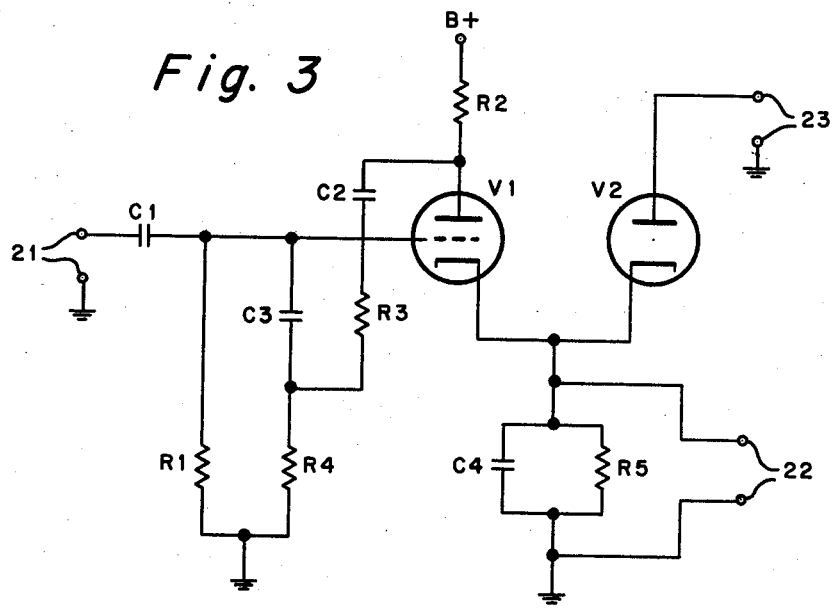
Fig. 3 shows a preferred embodiment for the novel expander circuit.

The schematic of Fig. 3 illustrates an electrical diagram for the expander circuit carrying out the theoretical principles just described using a triode in a range of its characteristic curve following the square law. A pair of tubes $V_1$ and $V_2$ are illustrated. $V_1$ is the triode having as its characteristic curve a portion following the square law described above while $V_2$ is a diode or other electronic uniflow device. The sine wave input at leads 21 is fed through a coupling circuit consisting of a capacitor $C_1$ and a resistor $R_1$ onto the grid of $V_1$. The plate of $V_1$ is supplied from a B+ voltage source through a dropping resistor $R_2$. A small negative feedback circuit consisting of $C_2$, $C_3$, $R_3$ and $R_4$ is provided to aid in the elimination of distortion, as is well understood in the art. The cathode of $V_1$ is connected to ground through a resistor $R_5$ and a condenser $C_4$ in parallel. The purpose of condenser $C_4$ is explained further below. Since triode $V_1$ is used in a cathode follower network the output of the system is taken off at leads 22 across the resistor $R_5$ and capacitor $C_4$. Diode $V_2$ is provided as a means to introduce the sawtooth wave without interfering with the sine wave. It isolates the sawtooth from the sine wave to prevent interaction and is a convenient means of modulation, as will be understood from the explanation below. The sawtooth input is impressed on leads 23 to the plate of diode $V_2$ while the cathode is connected to the resistor $R_5$ and condenser $C_4$ at the same point as is the cathode of $V_1$. Therefore, the cathodes of both tubes are connected together, and there is a complete circuit through diode $V_2$ connecting the sawtooth input at leads 23 through resistance $R_5$ to ground.

The operation of the circuit of Fig. 3 is as follows: The cathode follower amplifier circuit using triode $V_1$ acts in a conventional manner to amplify the sine wave input on its grid. The diode $V_2$, passing the positive sawtooth pulses on its plate, functions to change the grid bias or quiescent point in triode $V_1$ at a linear rate in accordance with the instantaneous amplitude of the sawtooth wave form. This is the same as shifting the input waves $w$ of Fig. 2 from points $Q_1$ to $Q_4$ in a smooth and continuous manner. The respective output waves $W_1$ to $W_4$ are illustrated. The voltage across bias resistor $R_5$ and leads 22 is shown in Fig. 1 as the output of the expander circuit 11.

It has been found necessary to utilize capacitor $C_4$ across resistor $R_5$ to eliminate undesirable harmonics and to prevent distortion. Of course, this limits the operation of the circuit to a particular frequency range, as is understood in the art, but $R_5$ and $C_4$ may be varied to pass any desired frequency.

Figure 4:
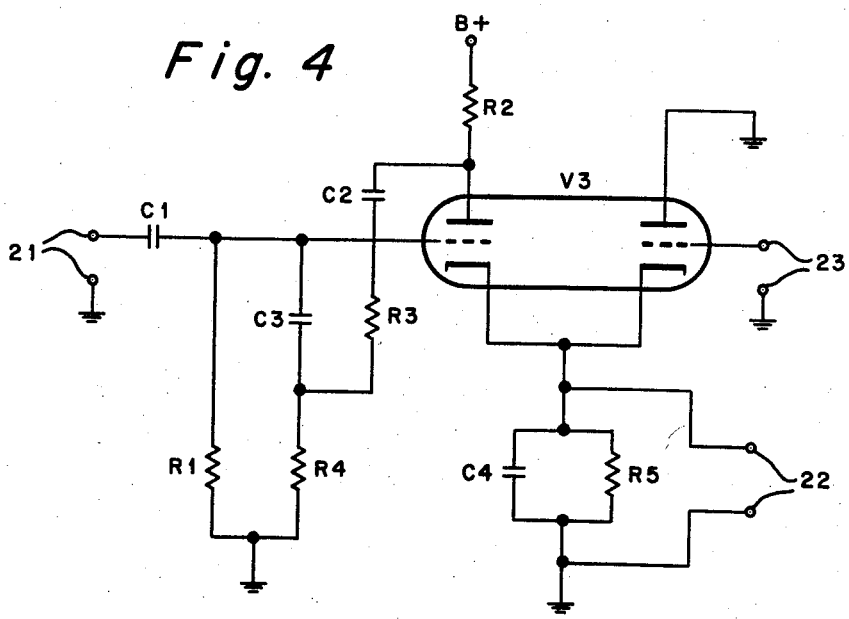
Fig. 4 shows a second preferred circuit diagram for the expander circuit of Fig. 3.

Fig. 4 shows a circuit identical to that of Fig. 3 except that a twin triode $V_3$ has been substituted for triode $V_1$ and diode $V_2$. The right hand triode, however, functions as a diode because the plate is grounded and the sawtooth voltage applied to the grid. All the other elements are the same as in Fig. 3 with no change in function. This is a more compact arrangement because a single tube instead of a pair is used. Also, the twin triode 12AU7 has the square law characteristic curve portion desired, and has proved quite successful in tests.

It is apparent that the apparatus described above will produce a timing wave which consists of a series of pulses consisting of sinusoids of linearly increasing amplitude. It will be seen that a relatively simple arrangement has been provided to produce such a timing wave which heretofore has been produced by more complex arrangements. Also, the timing wave produced is smooth in the sense that its amplitude increases continuously and smoothly rather than in discrete intervals as in other suggested arrangements. Of course, it is obvious that the circuits disclosed may without departing from the principles of this invention be altered to accommodate any desired frequency by merely selecting the proper components to bring about this result.

Since changes in this invention may be made without departing from the spirit and scope thereof it is intended that all matters contained in the foregoing description and shown in the accompanying drawings shall be interpreted as illustrative and not in a limiting sense.

What is claimed is:

1. An electronic expander for generating an output of pulses of sinusoids of linearly expanding amplitude comprising, in combination, electron tube means including a grid, cathode and anode in which plate current varies directly with the square of grid voltage in its operating range, means connecting the grid of said tube means to a source of sinusoidal waves at constant amplitude, means connecting a positive direct current voltage source through a dropping resistor to the anode of said tube means, a series resistive-capacitive means electrically operably connected between the anode and grid of said electron tube means for providing negative feedback, a load resistor placed between ground and the cathode of said tube means, means supplying a periodically recurring bias voltage increasing in amplitude at a linearly expanding rate to said grid for shifting the quiescent point of said tube means in said operating range, and means connected across said load resistor for taking the output of said expander.

2. An electronic expander for generating an output of pulses of sinusoids of linearly expanding amplitude comprising, in combination, electron tube means including a grid, cathode and anode in which plate current varies directly with the square of grid voltage in its operating range, means connecting the grid of said tube means to a source of sinusoidal waves at constant amplitude, means connecting a positive direct current voltage source through a dropping resistor to the anode of said tube means, a series resistive-capacitive means electrically operably connected between the anode and grid of said electron tube means for providing negative feedback, rectifying means having a cathode and at least one other electrode, means connecting the latter electrode to a source of periodically recurring sawtooth waves, means tying together the cathodes of both said electron tube means and said rectifying means, means electrically connecting said cathodes to ground through a load resistor for passing said sawtooth waves and thereby shifting the quiescent point of said electron tube means in said operating range in accordance with the rate of linearly changing amplitude of said waves, and means connected across said load resistor for taking the output of said expander.

3. The electronic expander of claim 2 in which the rectifying means comprises a diode having a cathode and an anode, said anode being connected to the source of periodically recurring sawtooth waves.

4. The electronic expander of claim 2 in which the electron tube means and the rectifying means comprises a double triode, the grid of one triode being connected to the source of sinusoidal waves at constant amplitude.

the grid of the other triode being connected to the source of periodically recurring sawtooth waves and the anode of said other triode being connected to a fixed reference.

References Cited in the file of this patent

UNITED STATES PATENTS

| | | |
|---|---|---|
| 2,272,842 | Hickok | Feb. 10, 1942 |
| 2,360,466 | Bedford | Oct. 17, 1944 |
| 2,408,414 | Donaldson | Oct. 1, 1946 |
| 2,481,354 | Schuler | Sept. 6, 1949 |
| 2,485,665 | Shepherd | Oct. 25, 1949 |
| 2,602,889 | Post | July 8, 1952 |
| 2,653,285 | Gray | Sept. 22, 1953 |
| 2,677,785 | Owen | May 4, 1954 |
| 2,692,334 | Blumlein | Oct. 19, 1954 |
| 2,840,634 | Bedford | June 24, 1958 |

FOREIGN PATENTS

| | | |
|---|---|---|
| 1,023,637 | France | Dec. 30, 1952 |